US006529567B1

(12) United States Patent
Pisek et al.

(10) Patent No.: US 6,529,567 B1
(45) Date of Patent: Mar. 4, 2003

(54) ELECTRONIC APPARATUS AND METHOD FOR RECEIVING NOISY SIGNALS

(75) Inventors: Eran Pisek, Holon (IL); Moshe Tarrab, Holon (IL); Eytan Engel, Rosh-Haain (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/265,221

(22) Filed: Mar. 10, 1999

(51) Int. Cl.[7] .............................................. H04L 27/06
(52) U.S. Cl. ...................................................... 375/341
(58) Field of Search ................................ 375/341, 262, 375/316; 714/794, 795

(56) References Cited

U.S. PATENT DOCUMENTS

| 5,500,811 A | 3/1996 | Corry .................... 364/724.16 |
| 6,269,124 B1 * | 7/2001 | Nagayasu et al. .......... 375/262 |
| 6,302,576 B1 * | 10/2001 | Ono et al. ................. 371/43.6 |

OTHER PUBLICATIONS

Chip Errata, DSP56305 Digital Signal Processor, Motorola Semiconductor Products Sector305CEOH78G 2 5, pp. 1–22 (1998).

Product Documentation, DSP56305, Motorola Semiconductor Technical Data, Motorola, Inc. pp. 0–3 (1997).

Motorola Semiconductor Product Information, DSP56305 Advance Information Single Chip Channel Codec Digital Signal Processor, Motorola Inc. (1996).

* cited by examiner

Primary Examiner—Chi Pham
Assistant Examiner—Khai Tran

(57) ABSTRACT

An electronic apparatus receives a noisy signal and produces and stores hard data and soft data. It has a first portion (210, 310) for receiving electromagnetic signals and producing hard data and soft data, and a second portion (200, 300) for storing soft data and hard data concerning a particular signal at a single location in a memory bank (270, 370), preferably at the same memory address. Hard data and soft data can be stored in consecutive memory cells. Hard data can overlap soft data. If hard data overlaps soft data, it preferably overlaps soft data least significant bits. The second portion (200, 300) has a memory bank (270, 370), a controller (260, 360) and also can have a synchronizer (390) for synchronizing between soft data and hard data concerning the same input signal.

7 Claims, 2 Drawing Sheets

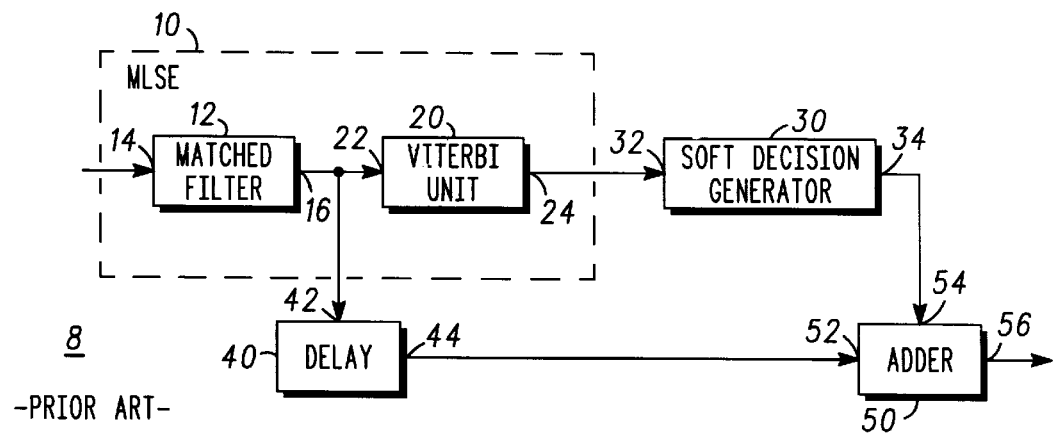
FIG. 1 —PRIOR ART—
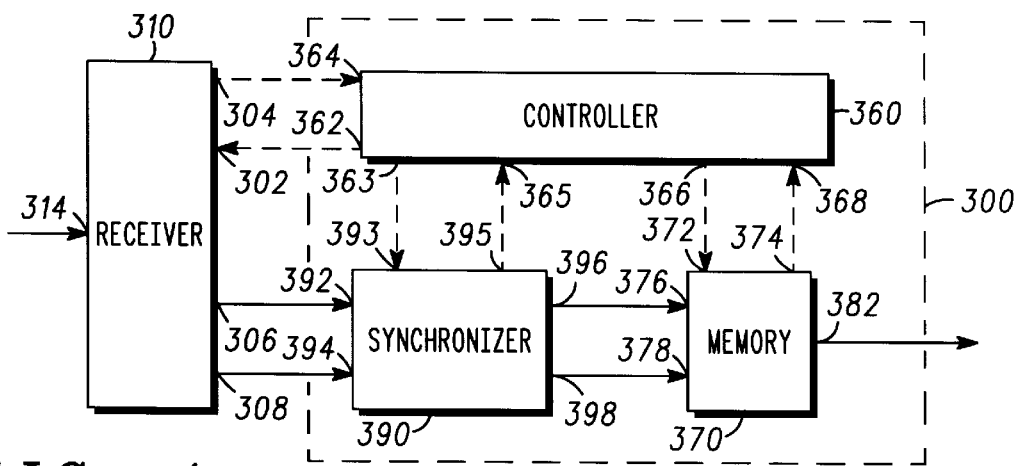
FIG. 4
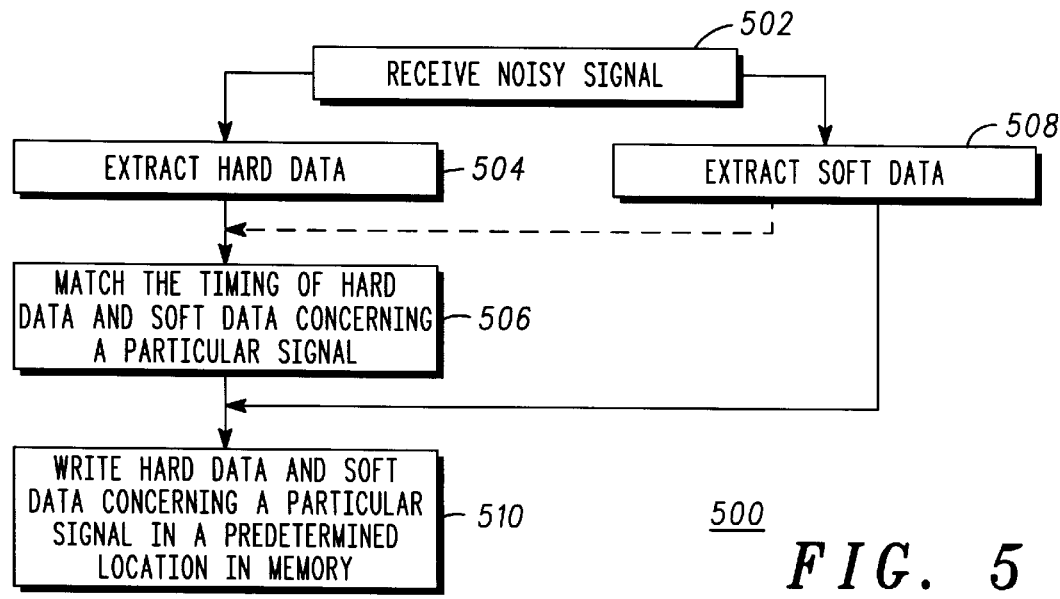
FIG. 5

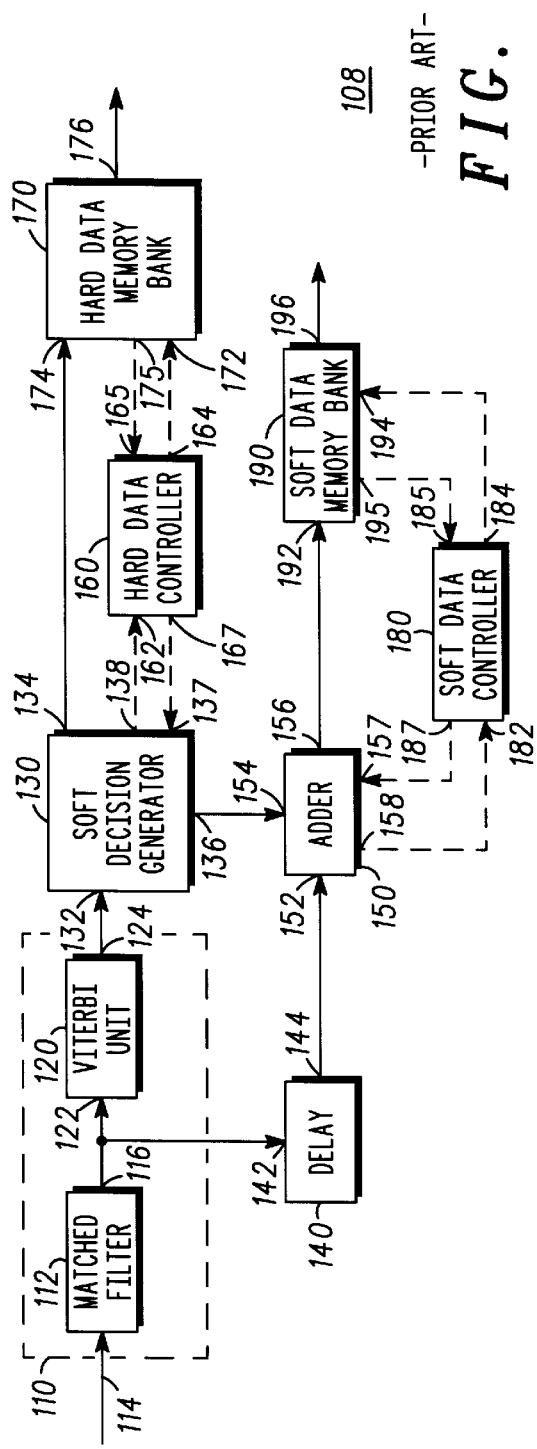

ELECTRONIC APPARATUS AND METHOD FOR RECEIVING NOISY SIGNALS

FIELD OF THE INVENTION

The invention concerns an electronic apparatus and method for receiving noisy signals.

BACKGROUND OF THE INVENTION

Many Electronic Apparatuses for Receiving Noisy Signals (i.e.—EARNS), such as, but not limited to a mobile car radio, include one or more filters and/or and one or more equalizers. Some filters or equalizers output signals can be in a form referred to in the art as "hard data" or "soft data". Methods and devices for producing hard data and soft data are well known in the art: for example, a Viterby Algorithm method, a Matched Filter, a Maximum Likelihood Sequence Estimator (i.e.—MLSE), and Inter Symbol Interference (i.e.—ISI) cancellation method. The following references give a description of some prior art methods and devices for producing hard data and/or soft data: "Soft-Output MLSE Equalization Methods for the Mobile Radio Channel", by J. Nowack, D. Borth and P. Rasky; "TCM on Frequency-Selective Fading Channels: a comparison of Soft-Output Probabilistic Equalizers", by P. Hoeher, Conf. Ref. GLOBECOM'90, pg. 401.1–401.1.6, December 1990, published by IEEE; "The Viterbi Algorithm", by G. D. Forney Jr., Proceedings of the IEEE, vol. 61, No. 3, pg. 258–278, March 1973; "A Viterby Algorithm with Soft-Decision Outputs and its Applications", by J. Hagenauer and P. Hoeher, Conf. Ref. GLOBECOM'89, Dallas, Tex., Vol. 3, pg. 47.1.1–47.1.7, November 1989; "Adaptive Maximum Likelihood Receiver for Carrier-Modulated Data Transmission Systems", by G. Ungerboeck,IEEE Transactions on Communications. COM-22, pg. 624–636, May 1974; U.S. Pat. No. 5,497,383 May 1996, J. Thome, A. Arora, N. Vinggaard, "Error Detector Circuit for Receiver Operative to Receive Discretely-Encoded Signals".

Hard data is usually represented by a single bit, and soft data is usually represented by several bits. Hard data contains a decision about a signal that was received by the EARNS and soft data contains data about reliability information. Soft data concerns both the received signal and the channel behavior.

Hard data can be the output signal of a Viterbi Algorithm unit (i.e.—Viterbi unit) and soft data can be the output signal of a matched filter or a soft decision generator (see FIG. 1). A soft decision generator can also output a hard data signal (see FIG. 2). The usage of both hard data and soft data increases the EARNS performance.

In the prior art, EARNS usually dealt with soft data and hard data in one of the following ways:
a. Storing hard data and soft data in separate data banks (as shown in FIG. 2).
b. Outputting just soft data, and using soft data Most Significant Bit (MSB) as hard data (as shown in FIG. 1).

The main disadvantage of the first arrangement is a complication of software and hardware, increased number of memory banks, increased number of Direct Memory Access (DMA) channels and controllers, and increased core access operation used to process the two kinds of data. The main disadvantage of the second arrangement is a decrease in EARNS performance, due to the fact that soft data MSB does not always equals the hard data.

For the above mentioned reasons and other reasons, there continues to be a need for an improved EARNS.

FIG. 1 shows typical prior art portion 8 of an EARNS, implementing an ISI-Cancellation method. Portion 8 has soft decision generator 30, having input 32 and output 34; delay element 40, having input 42 and output 44; adder 50 having input 52, inverting input 54 and output 56, and Maximum Likelihood Sequence Estimator (i.e.—MLSE) 10. MLSE 10 includes Matched Filter (i.e.—MF) 12, having input 14 and output 16 and Viterbi unit (i.e.—VA) 20, having input 22 and output 24. Output 16 of MF 12 is coupled to input 22 of VA 20 and to input 42 of delay element 40. Output 24 of VA 20 is coupled to input 32 of soft decision generator 30. Output 34 of soft decision generator 30 is coupled to inverting input 54 of adder 50. Output 44 of delay element 40 is coupled to input 52 of adder 50. Output signal appearing on output 24 of VA 24 is hard data. Output signals appearing on outputs 16, 34, 44, 56 of MF 12, soft decision generator 30, delay element 40 and adder 50 respectively, are soft data.

Portion 8 has no hard data signal output. The MSB of soft data is used as the hard data signal. The main disadvantage of this arrangement is a decreased performance.

FIG.2 is a schematic description of portion 108 of a prior art EARNS implementing an ISI-Cancellation method. Portion 108 has Maximum Likelihood Sequence Estimator (i.e.—MLSE) 110, wherein MLSE 110 has a Matched Filter (i.e.—MF) 112, having input 114 and output 116 and a Viterbi Algorithm unit (i.e.—VA) 120, having input 122 and output 124. Soft decision generator 130 has inputs 132, 137 and outputs 134,136,138. Delay element 140, has input 142 and output 144. Adder 150 has inputs 152, 157, inverting input 154 and outputs 156, 158. Hard data controller 160, has inputs 162, 165 and outputs 164, 167. Hard data memory bank 170, has inputs 172, 174 and outputs 175 and 176. Soft data controller 180, has inputs 182, 185 and outputs 187, 184, and soft data memory bank 190, has inputs 192, 194 and outputs 195 and 196.

Output 116 of MF 112 is coupled to input 122 of VA 120 and to input 142 of delay element 140. Output 124 of VA 120 is coupled to input 132 of soft decision generator 130. Output 144 of delay element 140 is coupled to input 152 of adder 150. Output 134 of soft decision generator 130 is coupled to input 174 of hard data memory bank 170. Output 138 of soft decision generator 130 is coupled to input 162 of hard data controller 160. Output 136 of soft decision generator 130 is coupled to inverting input 154 of adder 150. Output 164 of hard data controller 160 is coupled to input 172 of hard data memory bank 170. Output 156 of adder 150 is coupled to input 192 of soft data memory bank 190. Output 158 of adder 150 is coupled to input 182 of soft data controller 180. Output 184 of soft data controller 180 is coupled to input 194 of soft data memory bank 190. Output 167 of hard data controller 160 is coupled to input 137 of soft decision generator 130. Output 175 of hard data memory bank 170 is coupled to input 165 of hard data controller 160.

Soft data controller 180 handles data transfer from adder 150 to soft data memory bank 170 in a manner well known in the prior art. For example, adder 150 sends to soft data controller 180, via output 158 and input 182 respectively, a signal indicating that it has updated soft data. Soft data controller sends a 'WRITE' signal to soft data memory bank 190, causing the updated data within adder 150 to be written to soft data memory bank. Soft data controller can also determine in which address of soft data memory 190 to write the updated soft data.

Hard data controller 160 handles data transfer from soft decision generator 130 to hard data memory bank 170, in a manner well known in the prior art.

Hard data controller 160 and soft data controller 180 can be implemented by one or more Direct Memory Access (DMA) units, but can also be implemented by one or more interrupt generating units coupled to a processor. The main disadvantage of this arrangement is a complication of software and hardware, increased number of memory banks, increased number of Direct Memory Access (DMA) channels and controllers, and increased core access operation used to process the two kinds of data.

BRIEF DESCRIPTION OF THE DRAWINGS

FIG. 1 is a schematic diagram of a portion of an EARNS of a first implementation according to the prior art;

FIG. 2 is a schematic diagram of a portion of an EARNS of a second implementation according to the prior art;

FIG. 3 is a simplified schematic diagram of two portions of an EARNS according to a preferred embodiment of the invention;

FIG. 4 is a simplified schematic diagram of a portion of an EARNS according to a another preferred embodiment of the invention;

FIG. 5 is a simplified flow diagram of a method according to a preferred embodiment of the present invention.

DETAILED DESCRIPTION OF THE DRAWINGS

The present invention provides a cost efficient and simple EARNS. The usage of a single memory bank, and a single controller reduces the hardware and simplifies the software. Storing both hard data and soft data at the same memory address, simplifies the access to both types of data.

FIG. 3 is a simplified schematic diagram of two portions 200 and 210 of an EARNS. Portion 200 comprising: controller 260, having inputs 261,262, 265 and outputs 263, 264, 267; and memory bank 270 having inputs 272, 274,278 and outputs 275, 276. Portion 200 is coupled to portion 210 of the EARNS. Portion 210 has Matched Filter (i.e.—MF) 212, having input 214 and output 216; VA 220, having input 222 and output 224; soft decision generator 230 having inputs 232, 237 and outputs 234,236,238; delay element 240, having input 242 and output 244; adder 250 having inputs 252 and 257, inverting input 254 and outputs 256, and 258. Delay element 240 compensates for a time lapse between appearance of a first signal (appearing at output 216 of MF 212) and the soft data provided by output 234 of soft decision generator 230, concerning a particular received signal at input 114 of MF 112.

Output 216 of MF 212 is coupled to input 222 of VA 220 and to input 242 of delay element 240. Output 224 of VA 220 is coupled to input 232 of soft decision generator 230. Output 244 of delay element 240 is coupled input 252 of adder 250. Output 236 of soft decision generator 230 is coupled to input 274 of memory bank 270. Output 238 of soft decision generator 230 is coupled to input 262 of controller 260. Output 264 of controller 260 is coupled to input 272 of memory bank 270. Output 256 of adder 250 is coupled to input 278 of memory bank 270. Output 258 of adder 250 is coupled to input 261 of controller 260. Preferably, input 274 of memory bank 270 is coupled to the LSB or MSB of memory bank 270 internal data bus (not shown in FIG. 3), so that the output signal which is sent to input 274 is stored in the LSB or MSB of a memory word.

Controller 260 handles soft data and hard data transfer from output 256 of adder 150 and output 236 of soft decision generator 230, to memory bank 270.

Writing soft data and hard data to memory is done by control protocols well known in the art. For example, adder 250 sends, through, output 258 a signal indicating that output 256 contains updated soft data. This signal is received at input 261 of controller 260. Controller 260 sends memory bank 270 a signal indicating that memory bank 270 should read soft data at input 278. Memory bank 270 sends, through output 275, a signal indicating that it is ready to read the soft data. Controller 260 sends an output signal, through output 263, to input 257 of adder 250, causing adder 250 to send soft data, through output 256, to input 278 of memory bank 270. Controller 260 can be implemented by a Direct Memory Access (i.e.—DMA) controller, preferably the DMA controller within Motorola's 56305 chip. Preferably, a soft data are stores in a single location (i.e.—a memory range which is accessed by a single operation). For example, if a single memory word is read during a single read operation, and both soft data and hard data can be stored in a single memory word, this memory word is regarded as a single operation. Soft data and hard data concerning a particular signal can be stored in consecutive memory cells. Hard data may overlap soft data. If hard data overlaps soft data, it preferably overlaps soft data least significant bit.

If soft data and hard data, concerning a particular signal, appear simultaneously at output 256 of adder 250 and at output 236 of soft decision generator 230 then output 256 is coupled to input 272 of memory bank 270 and output 236 of soft decision generator 230 is coupled to input 274 of memory bank 270.

This synchronization can be achieved by extracting hard data from soft data generators 230 middle bits (i.e.—if soft data generator is M bits long and hard data is a single bit, hard data output 236 of soft decision generator 230 is coupled to the J'th bit, wherein J=truncated value of $\{(M+1)/2\}$. M and J being integers. For example, if M=9 then J=5, and the hard data is extracted from the 5'th bit of the soft decision generator 230.

FIG. 4 is a simplified schematic diagram of portions 300 and 310 of an EARNS for storing combined soft data and hard data. First portion 300 comprises synchronizer 390, having inputs 392, 394, 393 and outputs 396, 398, 395, memory bank 370 having inputs 376, 378, 372, and outputs 374, 382, and controller 360 having inputs 364, 365, 368 and outputs 362, 363, 366. First portion 300 is coupled to second portion 310 having inputs 302, 314, and outputs 304, 306, 308. Output 306 of second portion 310 is coupled to input 392 of synchronizer 390. Output 308 of second portion 310 is coupled to input 394 of synchronizer 390. Output 304 of second portion 310 is coupled to input 364 of controller 360. Input 302 of second portion 310 is coupled to output 362 of controller 360. Output 396 of synchronizer 390 is coupled to input 376 of memory bank 370. Output 398 of synchronizer 390 is coupled to input 378 of memory 370. Output 395 of synchronizer 390 is coupled to input 365 of controller 360. Input 393 of synchronizer 390 is coupled to output 363 of controller 360. Input 368 of controller 360 is coupled to output 374 of memory bank 370. Output 366 of controller 360 is coupled to input 372 of memory bank 370.

Synchronizer 390 is used to synchronize between hard data and soft data concerning the same input signal to second portion 310, so that both will be written a single location (i.e.—a memory range which is accessed by a single operation) within memory bank 370 or in consecutive memory bits. For example, if hard data appears at synchronizer input 392, G write cycles before soft data concerning the same input signal of second portion 300 appears at input 394 of synchronizer 390, than the hard data will be delayed for G clock cycles, before being sent to output 346 of synchronizer 390.

Synchronizer 390 can be implemented, for example, by a G-bit shift registers, or a series of cascaded D-type flip-flops.

In the following, method 500 according to the invention is explained with reference to FIG. 5. Method 500 comprising of the following steps:

In 'RECEIVE NOISY SIGNAL' step 502, an EARNS receives a noisy signal.

In 'EXTRACT SOFT DATA' step 508, EARNS extracts soft data from noisy signal. For example, soft data can be extracted by sending a noisy signal through Matched Filter 212, Viterbi Algorithm unit 220 and soft decision generator 230, and subtracting the output of the soft signal generator 230 from the output of the Matched Filter 212, as described in FIG. 3.

In 'EXTRACT HARD DATA' step 504, the EARNS extracts hard data from noisy signal. For example, hard data can be extracted by sending a noisy signal through Matched Filter 212, Viterbi Algorithm unit 220 and soft decision generator 230, of portion 210 (Receiver 310) as described in FIGS. 3 and 4.

In 'SYNCHRONIZE' step 506, soft data and hard data concerning a particular noisy signal, are synchronized, so that they can be written to a single address in the memory.

During 'WRITE HARD DATA AND SOFT DATA TO SAME ADDRESS IN MEMORY' step 510, hard data and soft data concerning a particular noisy signal are written to a single address in memory. Writing both hard data and soft data to the memory is conveniently handled by controller 260 (360). Controller 260 (360) can operate in compliance with known communication protocols. For example, adder 250 and soft decision generator 230 notify the controller 260 (360) that they have valid soft data and hard data concerning a particular signal. Then, controller 260 (360) verifies that data can be sent to memory bank 270 (370) and tells adder 250 and soft decision generator to write the hard and soft data to the same address in memory in memory bank 270 (370).

It will be understood by those skilled in the art that various changes in form and detail may be made without departing from the spirit and scope of the invention.

What is claimed is:

1. An electronic apparatus for receiving noisy signals comprising:
   - a portion for receiving signals and producing hard data and soft data, derived from the received signals;
   - a memory coupled to the first portion, for storing the hard data and the soft data;
   - a controller, coupled to the first portion and the memory, for transferring the soft data and the hard data to the memory; and
   - wherein the hard data and the soft data concerning a particular signal are written to a single location in memory.

2. The electronic apparatus of claim 1 wherein the hard data and the soft data overlap.

3. The electronic apparatus of claim 1, wherein the first portion has a synchronizer for compensating for a time lapse between appearance of the hard data and the soft data concerning a particular received signal at outputs of the first portion.

4. The electronic apparatus of claim 1, further comprising a delay element; wherein the delay element is coupled to the first portion and to the memory; wherein the hard data is sent through the delay element before being sent to the memory.

5. The electronic apparatus of claim 1, wherein the first portion comprises:
   - a matched filter, for providing a first signal as a response to a noisy signal;
   - a Viterbi unit, coupled to the matched filter;
   - an M-bit soft decision generator, coupled to the matched filter, for generating hard data and soft data;
   - an adder, coupled to the M-bit soft decision generator, for subtracting the soft data provided by the M-bit soft decision generator from the first signal;
   - a delay element, coupled to the matched filter, for compensating for a time lapse between appearance of the first signal and the soft data provided by the M-bit soft decision generator, concerning a particular received signal;

wherein the hard data is extracted from the soft decision generator and the soft data is outputted from the adder.

6. The electronic apparatus of claim 5, wherein hard data is extracted from the J'th bit of the soft data generator; wherein J=truncated value of $\{(M+1)/2\}$.

7. A method for receiving noisy signals comprising the following steps:
   - receiving a noisy signal;
   - extracting soft data from the noisy signal;
   - extracting hard data from the noisy signal;
   - synchronizing hard data and soft data concerning a particular noisy signal; and
   - writing hard data and soft data concerning the noisy signal to a single location in memory.

* * * * *